United States Patent [19]

Benz et al.

[11] 3,868,291

[45] Feb. 25, 1975

[54] WELDING TOOL FOR FORMING SYNTHETIC-RESIN PACKAGES

[76] Inventors: Gottlieb Benz; August Matzinger, both of c/o Maschinenfabrik Flums AG, 8890 Flums, Switzerland

[22] Filed: Feb. 16, 1973

[21] Appl. No.: 333,306

[52] U.S. Cl................ 156/515, 156/530, 156/583, 93/33 H, 53/204
[51] Int. Cl...................... B32b 31/18, B32b 31/20
[58] Field of Search .......... 156/515, 251, 518, 530, 156/583, 580, 581; 93/33 H; 53/182, 204

[56] References Cited
UNITED STATES PATENTS

| | | | |
|---|---|---|---|
| 2,638,964 | 5/1953 | Andina | 156/580 |
| 2,695,483 | 11/1954 | Toews | 53/182 X |
| 2,710,046 | 6/1955 | Markus et al. | 156/581 |
| 3,333,395 | 8/1967 | Doucette et al. | 53/182 |
| 3,505,149 | 4/1970 | Sanchez | 156/515 |
| 3,574,039 | 4/1971 | Fehr et al. | 156/515 |
| 3,701,707 | 10/1972 | Scholl et al. | 156/380 |
| 3,736,722 | 6/1973 | Rosenberg | 53/204 X |
| 3,772,850 | 11/1973 | Fujiwara | 156/515 |

FOREIGN PATENTS OR APPLICATIONS 788,969   7/1968   Canada.............................. 156/515

*Primary Examiner*—Douglas J. Drummond
*Assistant Examiner*—M. G. Wityshyn
*Attorney, Agent, or Firm*—Karl F. Ross; Herbert Dubno

[57] ABSTRACT

A welding thermal fusion tool has a pair of concentric cutting and welding rings received in an annular downwardly open channel of a housing. A thin polytetrafluoroethylene sheet under these rings is pinched between the rings and a pair of thermoplastic foils to be welded together and cut. This polytetrafluoroethylene layer can be removably clamped at the outer edge of the channel for trimming the outside of a package or projects as a sheet from a central plug for trimming the center from an annular package.

9 Claims, 6 Drawing Figures

PATENTED FEB 25 1975
3,868,291
SHEET 1 OF 2
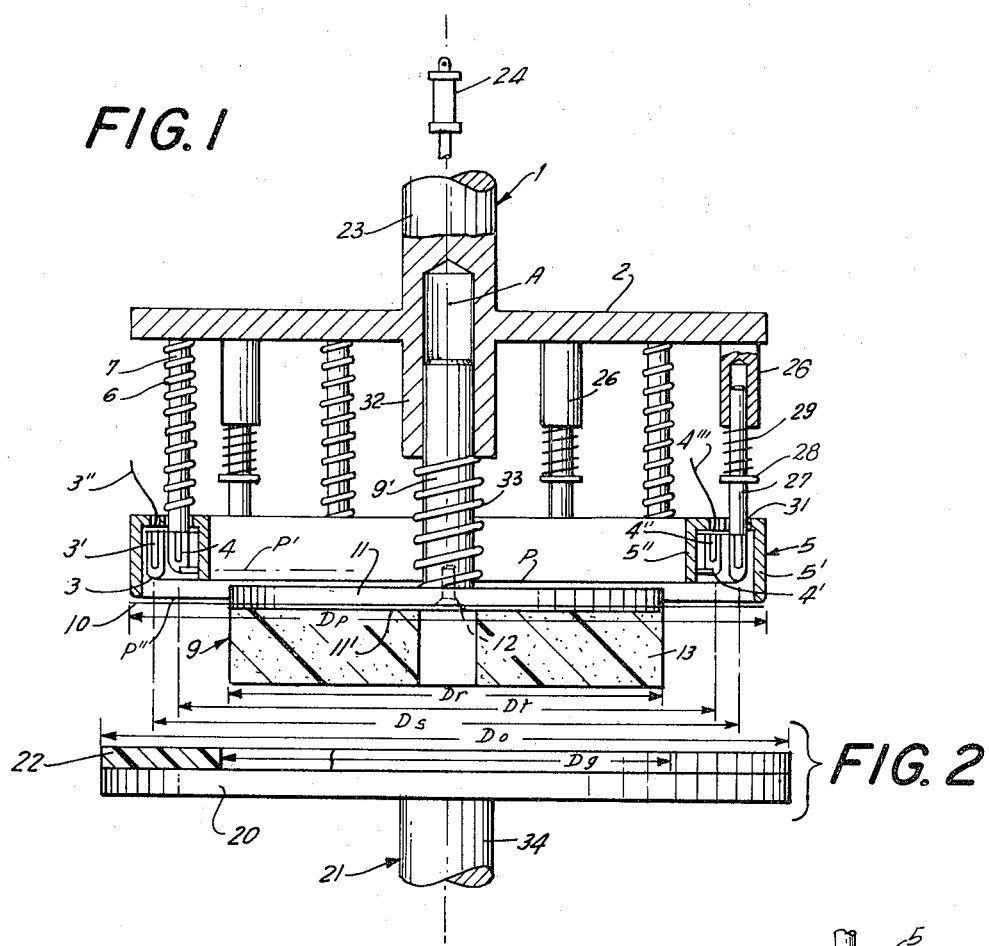
FIG. 1
FIG. 2
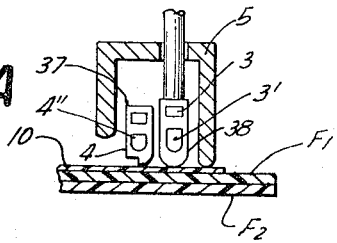
FIG. 3A
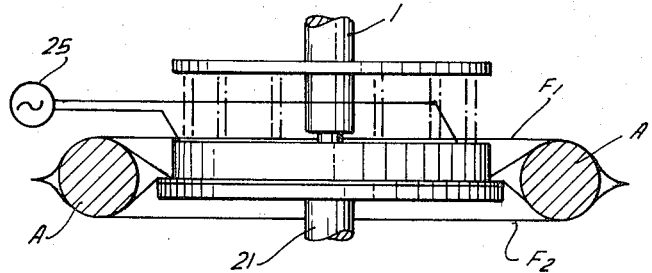
FIG. 3

3,868,291

WELDING TOOL FOR FORMING SYNTHETIC-RESIN PACKAGES

FIELD OF THE INVENTION

The present invention relates to a heated welding tool for a foil-packaging machine and, more particularly, to a tool which forms an annular weld around or within an article packaged between two foils of thermoplastic synthetic resin.

BACKGROUND OF THE INVENTION

The welding together of a pair of thermoplastic synthetic resin foils to form a package makes an inexpensive and tight unit but involves considerable difficulty. In order to weld the thermally fusible material it is necessary to heat it to its fusion temperature, so that the softened resin becomes likely to adhere to the welding edge. Even higher temperatures are used on the cutting blade in order to ensure a near cut. The expedient used to date to prevent these elements from becoming covered with the resin, usually polyethylene, is to coat them with polytetrafluoroethylene, known under the trademark Teflon or simply as PTFE. Such coatings function well when new, but once fouled, are as difficult to clean that it is the general practice to replace the cutting and welding tools altogether. Of course, such an expedient is expensive both due to the cost of the materials and to the inevitable downtime for the machine.

OBJECTS OF THE INVENTION

It is therefore an object of the present invention to provide an improved welding device for the formation of packages from thermally fusible synthetic resin foil webs.

Another object is to provide an improve welding and/or cutting tool for sealing and/or trimming packages of thermoplastic synthetic-resin sheets or foils.

Yet a further object is to provide an system for sealing thermoplastic packages which obviates the above-given disadvantages.

SUMMARY OF THE INVENTION

These objects are attained in accordance with the present invention in a tool having a welding element which is heated and engageable through the thermoplastic foils with a support to weld the two foils together at the contact region with the edge of the welding element confronting same. In accordance with the present invention, the welding element is mounted on a carrier on which is removably mounted a heat-transmitting and heat-resisting sheet element having an annular shape corresponding to the weld to be produced and arranged between the edge of the welding element and the support against which the foils to be welded are pinched. According to my present invention, this sheet is stiff so as to be self-supporting from one annular edge but should be sufficiently flexible and tough to allow thermal welding and cutting therethrough. It is made of polytetrafluoroethylene (PTFE or Teflon) which has a very high fusion temperature and which does not adhere to molten polyethylene.

In accordance with other features of this invention, the apparatus is provided with concentric annular cutting and welding elements, one within the other. Thus the package has no sharp and useless corners. In the case of an inner cutting element for a device to trim the center out of an annular package containing, for instance, an automobile tire, or a coil of wire, a central plug which carries the Teflon protection foil and also serves to punch out the center of the package. In the case of an outer cutting ring, the protective sheet member is also annular and is supported outside the cutter element.

According to yet another feature of this invention, the two concentric annular cutter and welding rings are received in a downwardly open channel engageable with the foils to be welded to clamp them against the support during welding and cutting. The protective sheet can be secured to this channel. Advantageously, the polytetrafluoroethylene ring is generally planar and perpendicular to the axis of the weld seam to be produced, preferably being composed by tightly woven or knitted silk-like fabric.

DESCRIPTION OF THE DRAWING

The above and other objects, features and advantages of the present invention will become apparent from the following description, reference being made to the accompanying drawing in which:

FIG. 1 is a vertical section through the displaceable part of the apparatus according to the present invention;

FIG. 2 is a side-elevational view of the support platen usable with the unit shown in FIG. 1;

FIG. 3 is a side view, partly in section, showing the apparatus in use, according to the present invention;

FIG. 3A is a large-scale sectional view of a detail of FIG. 3; and

SPECIFIC DESCRIPTION

Figure 4:
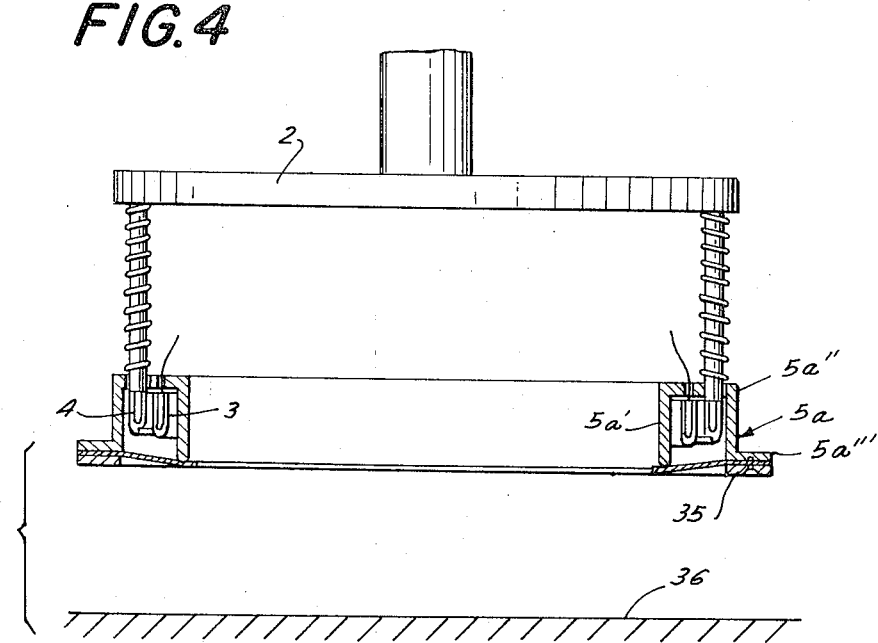
FIGS. 4 and 5 show an alternative embodiment of the present invention, partly in section, in the up and down positions, respectively.

As shown in FIGS. 1 and 2, the apparatus according to the present invention comprises an upper unit 1 engageable with a lower platen 21. The upper unit 1 has a steel shaft 23 carried on a fluid-operated cylinder 24 for vertical movement along an axis A. This shaft is provided with a transverse disk 2 from which depend six angularly equispaced rods 7 which are parallel to axis A and which are connected at their lower ends to a cutting ring 4 with a cutting edge 4'. This element 4 is provided with an internal heating element 4'' connected through leads 4''' to an alternating-current power source 25 (FIG. 3). Thus cutting ring 4 is circular and its cutting edge 4' has a diameter $D_t$.

Also depending from the disk 2 are six sleeves 26 which slidably receive pin 27 carrying respective snap rings 28. A compression spring 29 between a respective snap ring 28 and sleeve 26 is shown in FIG. 1 in uncompressed position. The lower end of each rod 26 is connected to a welding ring or collar 3, provided with an internal heating element 3' connected via wires 3'' to the elctric-current supply 25. This ring 3 has a diameter $D_s$ larger than the diameter $D_t$ and has a lower edge which is rounded.

The two concentric rings 3 and 4 are surrounded by a downwardly open channel 5 having a short inner side 5'' and a long outer side 5'. The inner side 5'' has its lower edge lying in the same plane P as the lower edge of the welding ring 3, which is slightly below the plane P' of the cutting edge 4'' of ring 4. The outer side 5' has a lower edge which lies below the plane P in a plane P''. This ring 5 is formed with 12 angularly equispaced holes 31 in two concentric radially spaced arrays through which the rods 7 and 27 pass. A prestressed compression spring 6 surrounding each rod 7 urges the holding element 5 down against the top of the cutting ring 4.

The disk 2 is formed in its center with a downwardly extending cylindrical sleeve 32 in which a rod 9' is slidably received. The lower end of the rod 9' is integral with a circular steel disk 11 which has a diameter $D_r$ substantially smaller than the diameter $D_t$. A compression spring 33 has one end secured in the sleeve 32 and an other end in the disk 11 and is shown in FIG. 1 in an unstressed condition. A disk 11' of the same size as the disk 11 carries a circularly annular foam-rubber pad 13 and is secured centrally to the disk 11 and rod 9' by a machine screw 12. Sandwiched between the disks 11 and 11' is a thin circularly annular sheet 10 of Teflon whose diameter $D_p$ is slightly larger than the outside diameter of the hold-down ring 5. These elements form a central punch 9 which, as described below, serves to push out the center of an annular package.

As shown in FIG. 2, below the unit 1 is a support platen comprising a steel disk 20 carried on an upright fixed shaft 34. A thick silicone rubber ring 22 having an outer diameter $D_o$ greater than diameter $D_p$, and an inner diameter $D_q$ smaller than $D_r$, is cemented to the top of the disk 20.

In use, as shown in FIGS. 3 and 3A, the apparatus of FIGS. 1 and 2 cuts out the center of an annular object A, here a tire, which is completely sealed between two shrinkable polyethylene foils $F_1$ and $F_2$. The entire unit 1 is lowered down into the center of the article A until the bottom surface of the foam-rubber block 13 presses the two foils together and is itself compressed. The entire unit 9 is pushed upwardly against the force of spring 33 until the outer side 5' of the ring 5 comes into engagement with the ring 22. This outer side 5' at this moment pinches the outer edge of the ring 10 and the two foils $F_1$ and $F_2$ together. The shield 5 is then pushed up against the springs 6, with the unit 9 also continuing to rise until the plane P of the welding ring 3 comes against the top of the sheet 10 pinched down over the two foils. At this point, the ring 4 with the channel 5 and the hold-down unit 9 all move up until the plane P' of the cutting edge comes against the top of the sheet 10, as shown in FIG. 3A, when the device is lowered no more.

The welding ring 3 has a rounded lower edge and is not maintained very hot so that it only fuses together the two foils $F_1$ and $F_2$. The cutter 4, however, is a good deal hotter, e.g. about 175° C, and has a sharp edge 4' so that it fuses and forms a cut in the foils, without cutting through the rugged Teflon sheet 10. As the elements 1 and 21 are separated, they re-assume the positions illustrated in FIGS. 1 and 2 so that the package, whose center has been cut free, can be removed and heat-treated to shrink the polyethylene foils $F_1$ and $F_2$ around the article A.

Figure 5:
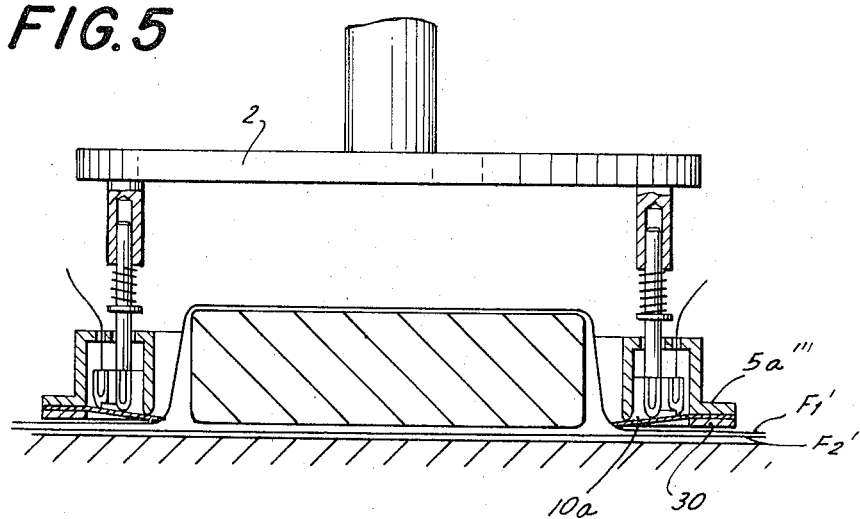

The embodiment of FIGS. 4 and 5 is substantially identical to that of FIGS. 1 and 2 except that no unit 9 is provided and a simple planar support 36 is used. The rings 3 and 4 are inverted, with the former within the latter, so that this device is used to trim off the excess of two foils $F_1'$ and $F_2'$ that project from around a packaged article B.

The channel shield 5a here has an outer side 5a'' slightly shorter than its inner side 5a' and provided with an outwardly extending lip or skirt 5a''' to which an annular planar ring 10a of polytetrafluoroethylene is secured by a metal ring 30 held in place with screws 35.

This arrangement functions much as the arrangement of FIGS. 1 and 3, except that it is brought down around the object B and is used to cut off the outside of the foils $F_1'$ and $F_2'$ so that subsequent heat treatment of this object B causes the polyethylene to draw tight and closely encase the object.

In both arrangements the protective Teflon sheet can be replaced quickly and easily. In the embodiment of FIG. 1 the screw 12 need merely be removed to separate the two disks 11 and 11' and thereby expose the sheet 10 so that it can be lifted off and replaced. The screws 35 of the embodiment of FIGS. 4 and 5 are similarly withdrawn to remove the ring 30 and thereby expose the sheet 10a.

The rings 3 and 4 are advantageously provided with respective temperature transducers 38 and 37 to sense their thermal condition and maintain them at a steady temperature, with the welding ring cooler than the cutting ring.

We claim:

1. An apparatus for welding together a pair of thermoplastic sheets, comprising:
   s support displaceable toward and away from said sheets;
   an annular welding element on said support engageable with said sheets;
   an annular cutting element on said support adjacent said welding element;
   a flat flexible and annular polytetrafluoroethylene foil having an inner periphery and an outer periphery and lying between said elements and said sheets, said elements and said foil being generally concentric;
   means for releasably securing one of said peripheries to said support while leaving the other periphery free for deflection of said annular foil toward and away from said sheets;
   means for heating said welding element to fuse said sheets together with said welding element pressing on said sheets through said foil; and
   means for heating said cutting element to a temperature above that of said welding element for severing of said sheets.

2. The apparatus defined in claim 1 wherein said elements are concentric arcuate rings, one of said elements being of smaller diameter than and surrounded by the other of said elements.

3. The apparatus defined in claim 2, further comprising an annular channel on said support open toward said sheets and having an inner side of smaller diameter than and surrounded by said elements and an outer side of greater diameter than and surrounding said elements.

4. The apparatus defined in claim 3, further comprising spring means between said channel and said welding element and said support biasing said channel and said welding element away from said support.

5. The apparatus defined in claim 3, further comprising a plug slidably mounted on said support and lying within said inner side of said channel, said foil extending outwardly as a skirt from said plug and under said elements, said cutting clement being within said welding element, whereby said inner periphery is secured to said plug.

6. The apparatus defined in claim 3 wherein said outer periphery is releasably secured on one of said sides of said channel.

7. The apparatus defined in claim 2 wherein said cutting element is of greater diameter than said surrounds said welding element.

8. The apparatus defined in claim 2 wherein said welding element is of greater diameter than and surrounds said cutting element.

9. The apparatus defined in claim 2 wherein said support includes a circular channel open toward said sheets.

* * * * *